(12) United States Patent
Nakamori et al.

(10) Patent No.: US 6,729,301 B2
(45) Date of Patent: May 4, 2004

(54) IGNITION TIMING CONTROL SYSTEM FOR INTERNAL COMBUSTION ENGINE

(75) Inventors: kenichi Nakamori, Aichi (JP); Jun Aoki, Aichi (JP); Katsunori Ueda, Aichi (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/457,379

(22) Filed: Jun. 10, 2003

(65) Prior Publication Data

US 2003/0226544 A1 Dec. 11, 2003

(30) Foreign Application Priority Data

Jun. 11, 2002 (JP) ........................................ 2002-170526

(51) Int. Cl.[7] ................................................. F02P 5/00
(52) U.S. Cl. ............................ 123/406.48; 123/568.21; 701/108
(58) Field of Search ...................... 123/406.48, 406.47, 123/406.45, 406.44, 406.11, 568.11, 568.14, 568.18, 568.19, 568.21; 701/108

(56) References Cited

U.S. PATENT DOCUMENTS

| | | | | |
|---|---|---|---|---|
| 5,168,952 A | * | 12/1992 | Oono et al. ................. | 180/197 |
| 5,832,721 A | * | 11/1998 | Cullen ......................... | 60/274 |
| 5,945,620 A | * | 8/1999 | Adamson .................... | 84/615 |
| 5,956,941 A | * | 9/1999 | Cullen et al. ................ | 60/274 |
| 6,089,206 A | * | 7/2000 | Suzuki et al. ............... | 123/295 |
| 6,497,212 B2 | * | 12/2002 | Matsumoto et al. ........ | 123/295 |
| 6,499,293 B1 | * | 12/2002 | Surnilla et al. ............. | 60/285 |
| 6,560,526 B1 | * | 5/2003 | Matekunas et al. ......... | 701/104 |

FOREIGN PATENT DOCUMENTS

JP       2001-254659 A       9/2001

* cited by examiner

*Primary Examiner*—John Kwon
(74) *Attorney, Agent, or Firm*—Birch, Stewart, Kolasch & Birch, LLP

(57) ABSTRACT

An ignition timing control system for an internal combustion engine includes an electronic control unit. In a transition state where an in-cylinder EGR rate varies, the unit calculates an ignition timing corresponding to the in-cylinder EGR rate by means of linear interpolation based on ignition timings for EGR and non-EGR operations determined from maps, sets a retard amount based on the ratio of the in-cylinder EGR rate to a target EGR rate, and performs ignition timing control based on a corrected ignition timing obtained by subtracting the retard amount from the calculated ignition timing, thus preventing occurrences of knocking due to excessively advanced ignition timing, and deteriorated fuel consumption and drivability.

7 Claims, 6 Drawing Sheets

IGNITION TIMING CONTROL SYSTEM FOR INTERNAL COMBUSTION ENGINE

BACKGROUND OF THE INVENTION

1. Technical Field

The present invention relates to an ignition timing control system for controlling the ignition timing of an internal combustion engine with EGR system.

2. Related Art

Exhaust gas recirculation (EGR) for recirculating engine exhaust gas through the engine's intake side into cylinders is widely practiced for reduction of combustion temperature in combustion chamber, whereby NOx emissions are reduced. In addition to NOx reduction, the EGR achieves another advantage that, given the same engine torque, the pressure in intake pipe increases greater than that attained by non-EGR operation, thus making it possible to reduce throttle loss. For this reason, fuel consumption can be improved by the EGR with a proper ignition timing which is set to provide the minimum advance for the best torque (MBT).

On the other hand, the EGR may cause slow combustion. For the countermeasure to relieve slow combustion, the ignition timing is advanced in accordance with the EGR rate in combustion chamber (hereinafter referred to as in-cylinder EGR rate). The in-cylinder EGR rate is represented, by way of example, by the ratio of an amount of EGR gas to an amount of fresh air that are introduced into the combustion chamber, and the determined EGR rate is provided for ignition timing control.

An engine with an EGR system generally operates to adjust the opening of an EGR valve for adjustment of an amount of EGR gas, the EGR valve being provided in an EGR passage that connects the engine's exhaust side to the intake side thereof. Since the engine intake system has a pressure storage effect, the in-cylinder EGR rate requires time to reach the intended EGR rate equivalent to the opening of the EGR valve which is opened or closed. In other words, there is a delay in changing the in-cylinder EGR rate with respect to the change in EGR valve opening.

This delay makes it difficult to calculate the in-cylinder EGR rate with accuracy. The calculation difficulty increases especially in a transition state, caused by a transition between EGR operation and non-EGR operation or by accelerated or decelerated vehicle running, where the in-cylinder EGR rate varies. As a consequence, it is quite difficult to control the ignition timing in a manner following the varying EGR rate so as to attain an optimal ignition timing that provides the MBT for improvement of fuel consumption.

In this regard, JP-A-2001-254659 discloses ignition timing control, wherein an amount of ignition timing advance for EGR operation and that for non-EGR operation are set beforehand in the form of map, respectively, as a function of engine rotation speed and intake air amount (amount of fresh air), whereas the in-cylinder EGR rate in the transition state is estimated. Then, amounts of ignition timing advance for EGR and non-EGR are subject to linear interpolation based on the estimated in-cylinder EGR rate, whereby an amount of ignition timing advance for the transition state is determined, which amount is used to correct a basic ignition timing to produce an optimum ignition timing to which the ignition timing is controlled. For the estimation of in-cylinder EGR rate, a steady-state EGR rate corresponding to engine rotation speed and intake air amount is determined from a map, and an EGR rate in a surge tank is determined from the steady-state EGR rate, etc. The estimation of in-cylinder EGR rate in the transition state is made based on the amounts of ignition timing advance for EGR and non-EGR operations, the steady-state EGR rate, and the EGR rate in surge tank of eight strokes past.

The ignition timing control using the linear interpolation of maps is based on the assumption that the ignition timing changes proportionally to the change in EGR rate. In actual, however, the change in EGR rate in a transition state is not in proportion to the change in ignition timing. The present inventors confirmed by experiments that, in a transition state, the ignition timing control based on linear interpolation causes the ignition timing to lead a proper ignition timing that provides the MBT.

Thus, the ignition timing control disclosed in JP-A-2001-254659 can cause knocking due to excessively advanced ignition timing during the transition state, and as a result, fuel consumption and drivability may be deteriorated.

SUMMARY OF THE INVENTION

An object of the present invention is to provide an ignition timing control system for an internal combustion engine for properly controlling the ignition timing even in a transition state where the EGR rate varies, to suppress occurrences of knocking due to excessively advanced ignition timing, thereby preventing deteriorated fuel consumption and drivability caused by knocking.

According to the present invention, there is provided an ignition timing control system for an internal combustion engine which comprises: EGR controlling means for controlling a valve opening of an EGR valve in accordance with a target EGR rate varying depending on an operating state of the internal combustion engine, the EGR valve being provided in an EGR passage that connects an exhaust system of the internal combustion engine to an intake system thereof; EGR rate estimating means for estimating an EGR rate of the internal combustion engine in accordance with the operating state thereof; target ignition timing setting means for setting a target ignition timing, corresponding to the EGR rate estimated by the EGR rate estimating means, based on an ignition timing for EGR operation and an ignition timing for non-EGR operation that are individually determined from first and second maps set in advance; retard amount setting means for setting a retard amount based on a ratio between the estimated EGR rate and the target EGR rate; ignition timing correcting means for correcting the target ignition timing, set by the target ignition timing setting means, in accordance with the retard amount set by the retard amount setting means; and ignition timing controlling means for controlling the ignition timing of the internal combustion engine in accordance with the target ignition timing corrected by the ignition timing correcting means.

According to the present invention, the EGR valve opening is controlled based on the target EGR rate that varies in dependence on the engine operating state. Depending on the EGR valve opening, exhaust gas serving as EGR gas is recirculated from the exhaust system of the engine to the intake system thereof, whereby the EGR rate of the internal combustion engine is adjusted to the target EGR rate. The EGR rate of the engine is estimated based on the engine operating state, whereas ignition timings for EGR and non-EGR operations are determined from the maps that are set beforehand. Based on these ignition timings, a target ignition timing is set, which corresponds to the estimated EGR rate.

When the target EGR rate varies with the changing engine operating state, the EGR valve opening is controlled by the EGR controlling means in such a manner that actual EGR rate follows the target EGR rate. However, due to the pressure storage effect of the intake system, the actual EGR rate changes with a delay with respect to the change in target EGR rate. In a transition state, e.g., during a transition between EGR and non-EGR operations, the target EGR rate changes, without delay, between the target EGR rate for the EGR operation and that (=0) for the non-EGR operation, and accordingly, the ratio between the target EGR rate and the estimated EGR rate (corresponding to the actual EGR rate) estimated by the EGR rate estimating means varies within a range from 0 to 1.0.

More specifically, just after the start of transition from non-EGR operation to EGR operation, the target EGR rate changes, without delay, from a value (=0) used prior to the start of transition (i.e., used for the non-EGR operation) to a larger value used even after completion of transition (i.e., used for the EGR operation), whereas the estimated EGR rate remains at a value (=0) used prior to the start of transition, so that the ratio of the estimated EGR rate to the target EGR rate is equal to a value of 0. The estimated EGR rate follows the target EGR rate with a delay during the transition from non-EGR operation to EGR operation (more generally, in a transition state), and reaches the same value as the target EGR rate when the transition is completed. Thus, the ratio varies from 0 to 1.0 in the transition state. On the contrary, just after the start of a transition from EGR operation to non-EGR operation, the target EGR rate promptly changes from a value used prior to the start of transition (i.e., for the EGR operation) to a smaller value used even after completion of transition (i.e., for the non-EGR operation), whereas the estimate EGR value remains at a value (>0) used prior to the start of transition, so that the ratio of the target EGR rate to the estimated EGR rate is equal to 0. Thereafter, the estimated EGR rate follows the target EGR rate with a delay and finally reaches the same value as the target EGR rate. In the transition state, therefore, the ratio varies from 0 to 1.0.

In the present invention, a retard amount is set based on the ratio between the estimated and target EGR rates, a target ignition timing is corrected to the retard side by using the set retard amount, and the engine ignition timing is controlled based on the corrected target ignition timing. As a result, in a transition state where the EGR rate varies, the target ignition timing is set to the retard side, as compared to a case where the target ignition timing is determined by means of linear interpolation based on the ignition timings for EGR and non-EGR operations. This makes it possible to achieve an ignition timing more close to the ignition timing that provides the MBT, thus suppressing occurrences of knocking in a transition state, which would be otherwise caused by excessively advanced ignition timing, whereby deteriorated fuel consumption and drivability caused by knocking can be prevented.

In the present invention, preferably, the retard amount setting means sets the retard amount to be larger in an intermediate zone of the variable range of the ratio between the estimated and target EGR rates.

While the ignition timing control of this invention is being performed in a transition state, e.g., during a transition between EGR and non-EGR operations, the ratio between the estimated and target EGR rates is at a value of 0 or slightly larger than 0 in an initial stage of the transition state, whereas the ratio is at a value of 1.0 or slightly smaller than 1.0 in a final stage of the transition state. In this regard, the preferred arrangement of the invention sets the retard amount to be larger in an intermediate zone of the variable range of the EGR rate ratio. For instance, the retard amount is set to be equal to a minimum value (e.g., a value of 0) when the ratio falls within a zone (corresponding to an initial stage of transition state) of the variable range of the EGR rate ratio in which zone the ratio is at a value close to 0, or when the ratio falls within a zone thereof (corresponding to a final stage of transition state) in which the ratio is at a value close to 1.0, whereas it is set to a maximum value when the EGR rate ratio is at, e.g., the center (corresponding to a middle stage of the transition state) of the intermediate zone of the variable range thereof. In this case, during the ignition timing control in the transition state, the retard amount increases from the minimum value to the maximum value and then decreases from the maximum value to the minimum value.

With the preferred arrangement of this invention, during the ignition timing control in a transition state, the ignition timing is largely retarded in a middle stage of the transition state by using the retard amount which increases in the intermediate zone of the variable range of the EGR rate ratio, thus making it possible to positively prevent occurrences of knocking due to excessively advanced ignition timing in the transition state, especially, in the middle stage thereof.

More preferably, the ignition timing control system further comprises clip value setting means for setting a clip value, representing an allowable upper limit of the retard amount, in accordance with rotation speed and load of the internal combustion engine, and the ignition timing correcting means corrects the target ignition timing based on the retard amount that is limited to the clip value.

Preferably, the ignition timing control system further comprises correction coefficient setting means for setting a correction coefficient, which is to be used to correct the retard amount, in accordance with the rotation speed and load of the internal combustion engine, and the ignition timing correcting means corrects the target ignition timing in accordance with the retard amount corrected by using the correction coefficient.

In a transition state where the EGR rate varies, a proper ignition timing characteristic providing the MBT varies in dependence on the engine operation state. With the preferred arrangements, the retard amount is restricted to its allowable upper limit defined by the clip value or is corrected by means of the correction coefficient, the clip value and the correction coefficient being variably set based on the engine rotation speed and engine load, thus making it possible to attain a proper retard amount for correction of the target ignition timing irrespective of the engine operation state, whereby a proper ignition timing control can be realized.

A proper ignition timing characteristic to provide the MBT varies depending on the engine operation state, especially, the EGR rate of the engine, and the ignition timing characteristic providing the MBT is more shifted to the retard side as the EGR rate increases. Thus, the clip value or coefficient setting means is preferably constructed such as to set the clip value or correction coefficient to be larger with the increasing EGR rate determined from engine rotation speed and engine load. In such a case, at a larger EGR rate where knocking is liable to occur due to excessively advanced ignition timing, the target ignition timing is largely corrected to the retard side with the increasing clip value or with the increasing correction coefficient, whereby the ignition timing is controlled more properly.

Preferably, the ignition timing control system of this invention is applied to an internal combustion engine comprising a surge tank in which fresh air introduced from the intake system of the engine is mixed with the EGR gas introduced through the EGR passage from the exhaust system of the engine, and an intake manifold which includes branches and through which the surge tank is connected with respective cylinders of the engine. In this preferred control system, the EGR rate estimating means includes: first EGR-rate calculating means for calculating an EGR rate in the surge tank each time mixture gas is transported from the surge tank to the branches upon intake stroke of the internal combustion engine; EGR rate storing means for storing, as a preceding value, the EGR rate of mixture gas in each of those regions of the branches which are divided in advance in accordance with a transportation stroke of the mixture gas caused with the intake stroke of the engine; second EGR-rate calculating means for calculating an EGR rate of the mixture gas in each region after the transportation stroke and an EGR rate of mixture gas introduced into the respective cylinders after the transportation stroke, each time the mixture gas is transported upon the intake stroke of the internal combustion engine, in accordance with the EGR rate in the surge tank calculated by the first EGR-rate calculating means, the preceding value of the EGR rate in each region that is stored in the EGR rate storing means, and volumetric-change-related value correlating with a volumetric change in the mixture gas in the branches; and EGR rate renewing means for renewing the EGR rate, stored in the EGR rate storing means, in accordance with the EGR rate of the mixture gas in each region of the branch each time the EGR rate is calculated by the second EGR-rate calculating means.

More preferably, the second EGR-rate calculating means sets the volumetric-change-related value based on a preceding value and a present value of pressure in the surge tank.

Preferably, the first EGR-rate calculating means calculates an EGR amount introduced into the surge tank in accordance with an EGR flow velocity and the valve opening of the EGR valve linearized so as to correspond to an opening area of the EGR valve, and calculates the EGR rate in the surge tank in accordance with an EGR partial pressure in the surge tank determined from the EGR amount and a fresh-air partial pressure corresponding to an amount of fresh air introduced into the surge tank.

These three preferred arrangements make it possible to accurately estimate the EGR rate of mixture gas introduced into each engine cylinder, whereby the ignition timing can be controlled more properly.

Meanwhile, in an EGR rate estimating process disclosed in JP-A-2001-254659, an EGR rate of mixture gas (including fresh air and EGR gas) newly introduced into a surge tank is determined based on the valve opening of an EGR valve and engine operating state and is subject to a relaxation process by means of a first-order filter, whereby the process of mixing of the newly introduced mixture gas with residual mixture gas in the surge tank is simulated, and the EGR rate in the surge tank of eight strokes past is regarded as the present in-cylinder EGR rate on the assumption that the eight-stroke-old mixture gas in the surge tank is introduced into the engine cylinder at the present time. However, it is difficult for the relaxation process to simulate the gas mixing process in the surge tank and the transportation process in intake manifold branches, and the eight-stroke-old EGR rate in the tank cannot accurately represent the in-cylinder EGR rate at the present time, especially, during the accelerated or decelerated vehicle running. In this regard, the present invention estimates the EGR rate by using a volumetric-change-related value correlating with a volumetric change of mixture gas, thus making it possible to satisfactorily simulate the transportation process in the branches and the gas mixing process in the surge tank, whereby the EGR rate can be estimated with accuracy.

DETAILED DESCRIPTION

An ignition timing control system according to an embodiment of this invention will be explained hereinbelow.

Figure 1:
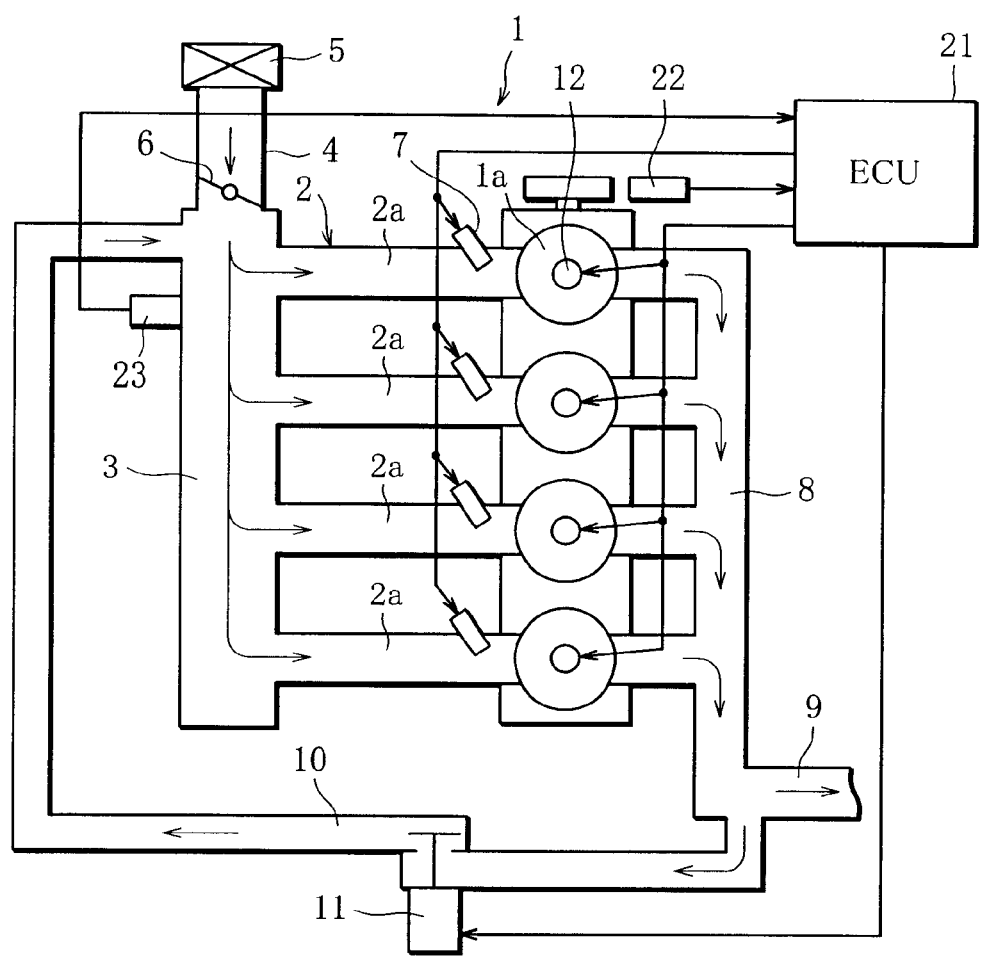
FIG. 1 is a view showing the whole arrangement of an ignition timing control system according to an embodiment of the present invention.

In FIG. 1, reference numeral 1 denotes an engine to which the ignition timing control system of this embodiment is applied. The engine 1 is constructed in the form of an intake-pipe injection type inline four-cylinder gasoline engine that is provided with cylinders whose combustion chambers 1a are connected with a surge tank 3 through branches 2a of an intake manifold 2, and the surge tank 3 is connected through an intake passage 4 to an air cleaner 5. The intake manifold 2, surge tank 2 and intake passage 4 constitute the intake system of the engine. Intake air introduced through the air cleaner 5 to the intake passage 4 is subject to a flow-amount adjustment effected by a throttle valve 6, is introduced into the surge tank 3, flows through respective branches 2a of the intake manifold 2, and is introduced into the combustion chambers 1a of the engine cylinders upon opening of intake valves (not shown), together with fuel injected from fuel injectors 7 provided in the branches 2a.

The respective combustion chambers 1a are connected through an exhaust manifold 8 to an exhaust passage 9, which cooperates with the exhaust manifold 8 to constitute the exhaust system of the engine. The exhaust passage 9 is connected to the surge tank 3 through an EGR passage 10 provided with an EGR valve 11. The injected fuel, introduced into the combustion chamber 1a together with the intake air, is ignited at a predetermined timing by means of an ignition plug 12 provided in each cylinder. After combustion of fuel, exhaust gas is discharged from the combustion chamber 1a upon opening of an exhaust valve (not shown), and most part of the exhaust gas is discharged to the outside through the exhaust manifold 8, the exhaust passage 9, and a catalytic converter (not shown), whereas the remaining part of the exhaust gas, serving as EGR gas, is recirculated from the EGR passage 10 to the surge tank 3 in an amount corresponding to the degree of opening of the EGR valve 11.

In this embodiment, the EGR gas is recirculated to the surge tank 3, however, the EGR gas may be circulated to the branches 2a. Both the arrangements have advantages and disadvantages. The arrangement to recirculate the EGR gas to the surge tank 3 is advantageous in engine output since it has a longer intake system length measured on the downstream side with respect to a junction of the intake system and the EGR passage, thus causing a smaller reduction in inertial supercharging effect, as compared to the arrangement to recirculate the EGR gas to the branches 2. On the other hand, the former arrangement is disadvantageous in that it may require a complicated EGR-rate estimation such that the gas mixing in the surge tank 3 and the gas transportation in the branches 2a must be taken into consideration in estimating the EGR rate of mixture gas (fresh intake air and EGR gas) introduced into the combustion chamber 1a.

An ECU (electronic control unit) 21 is installed in a vehicle compartment. The ECU 21 is provided with input/output devices, storage devices (ROM, RAM, etc.) for storing control programs, control maps, etc., a central processing unit (CPU), timer counters and the like, none of which is illustrated. The ECU 21 is connected at its input side with various sensors such as a rotation speed sensor 22 for detecting engine rotation speed Ne, an intake air pressure sensor 23 for detecting negative intake air pressure Pb in the surge tank 3, etc., and is connected at its output side with various devices such as the fuel injection valves 7, EGR valve 11, ignition plugs 12, etc.

The ECU 21 is designed to set target values for fuel injection amount, EGR rate, ignition timing, etc., on the basis of pieces of information detected by and supplied from the sensors, and control the fuel injection valves 7, EGR valve 11, ignition plugs 12, etc., in accordance with the target values. Thus, the ECU 21 has a function of serving as a primary element of the ignition timing control system of this embodiment, in addition to a function for engine control including fuel injection control. In the meantime, the EGR valve 11 is designed to be opened and closed by means of a stepper motor (not shown), for instance. The stepper motor adjusts the opening (e.g., valve lift amount) of the EGR 11 in accordance with a drive signal (indicating a step number) supplied from the ECU 21.

The setting of ignition timing, fuel injection amount, etc., is performed by means of interpolation of maps, set beforehand, for EGR operation and non-EGR operation in accordance with the EGR rate at the present time. Therefore, the EGR rate of the mixture gas introduced into the combustion chamber 1a of each cylinder (hereinafter referred to as in-cylinder EGR rate $R_C(n)$) must be estimated prior to the setting of the ignition timing, etc. In this regard, the ECU 21 carries out the process of estimating the in-cylinder EGR rate $R_C(n)$, as will be described below.

Figure 2:
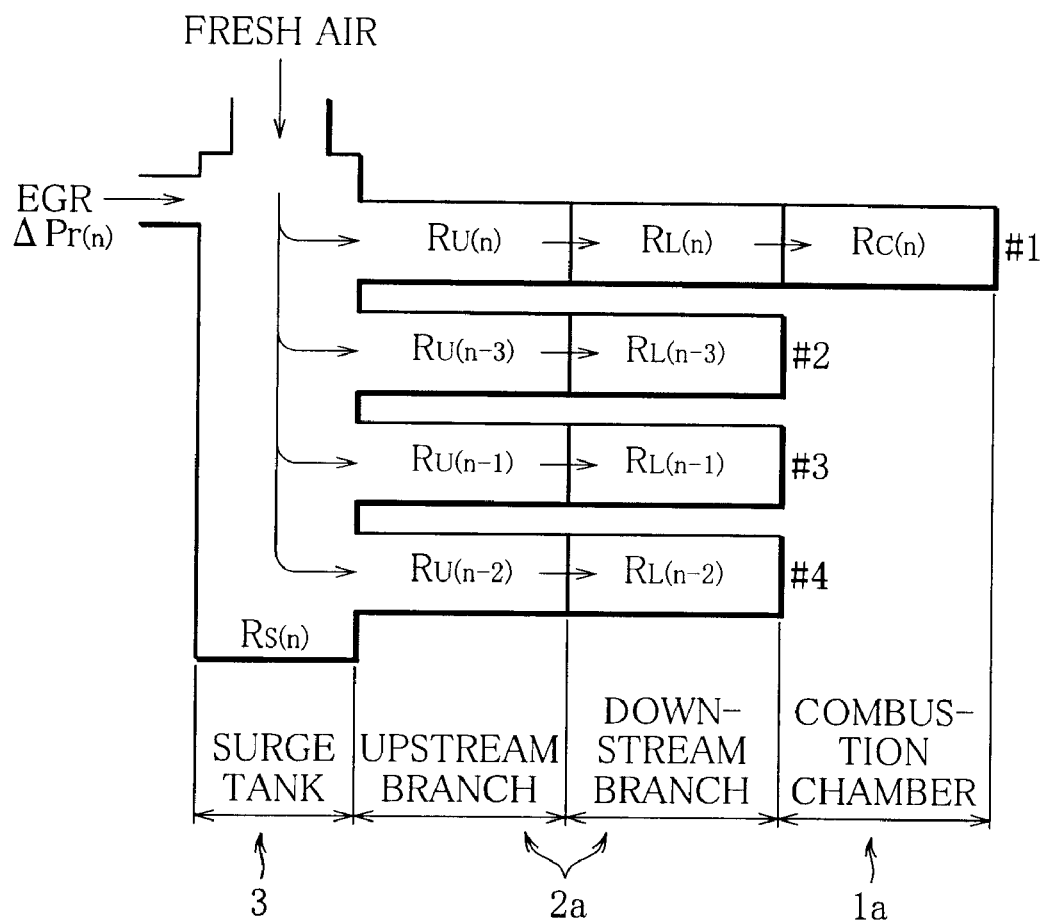
FIG. 2 is a view showing an intake system of an internal combustion engine in a schematic form.

Referring to FIG. 2 schematically showing the intake system of the engine 1, fresh air and EGR gas are introduced from the intake passage 4 and the EGR passage 10 into the surge tank 3, respectively, to be mixed with residual gas in the surge tank 3, thereby changing the EGR rate of mixture gas in the surge tank 3 (hereinafter referred to as in-tank EGR rate $R_S(n)$). The mixture gas is transported through the branches 2a to be introduced into the combustion chambers 1a in sequence in accordance with the ignition order (e.g., #1-#3-#4-#2).

The EGR-rate estimating process is performed based on the following assumptions (1)–(3).

(1) Each branch 2a has its volume that is twice as large as the cylinder volume (displacement);

(2) Newly introduced fresh air and EGR gas are uniformly mixed with residual mixture gas in the surge tank 3 during one stroke of the engine 1; and (3) The mixture gas in each branch 2a is transported to the downstream side upon intake stroke of a corresponding cylinder.

Thus, each time the intake valve of a given cylinder opens, the mixture gas in the surge tank 3 and in the corresponding branch 2a is transported. When the engine 1 is operated in a steady state where the pressure in the surge tank 3 is nearly at constant, the mixture gas is transported in the branch 2a by an amount corresponding to the cylinder volume, i.e., by a stroke which is half the branch length, without being compressed or expanding. Such compression or expansion may be caused by a change in pressure on the surge tank 3 side.

More specifically, when the intake valve opens, mixture gas in a downstream half of the branch 2a is introduced into the combustion chamber 1a, and accordingly, mixture gas in an upstream half of the branch 2a is transported to the downstream half thereof and part of mixture gas in the surge tank 3 is transported to the upstream half of the branch 2a. In this regard, as shown in FIG. 2, each branch 2a is divided into two, i.e., an upstream branch and a downstream branch. In FIG. 2, symbols $R_U(n)$ and $R_L(n)$ individually denote EGR rates in the upstream and downstream branches (hereinafter referred to as upstream branch EGR rate and downstream branch EGR rate, respectively).

In FIG. 2, suffixes n, n−1, n−2 and n−3 to the upstream and downstream branch EGR rates $R_U$, $R_L$ of respective branches reflect the ignition order (#1-#3-#4-#2) in this embodiment.

The estimation of in-cylinder EGR rate $R_C(n)$ is carried out by way of substantially two processes. First, a process of estimating the in-tank EGR rate $R_S(n)$ is performed by making a simulation of the mixing process of mixture gas introduced into the surge tank 3 with the residual mixture gas therein. Next, a process of estimating the in-cylinder EGR rate $R_C(n)$ is performed by making a simulation of the transportation process of the mixture gas in the branch 2a. These estimating processes are conducted by the ECU 21 for every one stroke of the engine 1 in accordance with an operation flow shown in FIG. 3, as will be described below.

Process of Estimating the In-Tank EGR Rate $R_S(n)$

A valve opening S of the EGR valve 11 is input to an EGR opening area calculating section 31 in term of the number of steps (which number correlates with valve lift amount). In accordance with the EGR valve opening S, the calculating section 31 determines the EGR valve opening S' equivalent to the opening area from a map in which EGR valve opening S is linearlized so as to correspond to opening area. An EGR flow velocity calculating section 32 receives engine rotation speed Ne and negative intake pressure Pb to determine an EGR flow velocity Q from a map.

The determined EGR opening area S and EGR flow velocity Q are input to an EGR amount calculating section 33 where an EGR amount $\Delta Pr(n)$ introduced into the surge tank 3 during one stroke is calculated in accordance with the following formula (1) where EGR amount $\Delta Pr(n)$ is represented in units of partial pressure in the surge tank 3.

$$\Delta Pr(n) = S \times Q \qquad (1)$$

The EGR amount $\Delta Pr(n)$ is input to an EGR partial pressure calculating section 34 which calculates EGR partial pressure $Pr(n)$ in the surge tank 3 in accordance with the following formula (2):

$$Pr(n)=Pr(n-1)\times(1-Vcyl/Vst)+\Delta Pr(n)\times Vcyl/Vst \qquad (2)$$

where Vcyl and Vst denote cylinder volume and surge tank volume, respectively, and the ratio Vcyl/Vst denotes the degree of influence of the inflow and outflow of mixture gas for each cylinder upon the mixture gas inflow and outflow for the entire surge tank 3. The first term of the right side of formula (2) indicates the partial pressure of residual mixture gas in the surge tank 3 after the EGR gas of one-stroke-old partial pressure $Pr(n-1)$ is discharged from the surge tank 3 in amount corresponding to the cylinder volume, whereas the second term of the right side of the formula (2) indicates the partial pressure of mixture gas newly introduced into the surge tank 3. By adding them, the EGR partial pressure $Pr(n)$ in the surge tank 3 at the present time is calculated.

The EGR partial pressure $Pr(n)$ is input to an in-tank EGR rate calculating section 35 wherein in-tank EGR rate $R_S(n)$ is calculated in accordance with the following formula (3):

$$R_S(n) = EGR \text{ partial pressure}/\text{fresh air partial pressure} \times 100 \qquad (3)$$

$$= Pr(n)/\{Pb(n)-Pr(n)\}\times 100,$$

where Pb is an average value of negative intake pressure during one stroke.

Process of Estimating the In-Cylinder EGR Rate $R_C(n)$

The calculated in-tank EGR rate $R_S(n)$ is utilized for the processing in EGR rate estimating means (i.e., an upstream branch EGR rate calculating section 36, a downstream branch EGR rate calculating section 37, and an in-cylinder EGR rate calculating section 38), together with the four-stroke-old upstream and downstream branch EGR rates $R_U(n-4)$, $R_L(n-4)$, and the negative intake pressures $Pb(n)$, $Pb(n-4)$ at the present time and of four strokes past. In the EGR rate calculating sections 36, 37 and 38, the upstream and downstream branch EGR rates $R_U(n)$, $R_L(n)$, and in-cylinder EGR rate $R_C(n)$ are calculated, respectively.

As will be described below, in the present embodiment, the compression and expansion of mixture gas in the branches 2a are taken into account in the calculation of EGR rates $R_U(n)$, $R_L(n)$ and $R_C(n)$. In view of the fact that the compression and expansion of mixture gas are caused by a change in pressure in the surge tank 3 which is in turn caused by the opening and closure of the throttle valve 6, a steady, accelerated or decelerated state is determined based on an amount of change in negative intake pressure Pb (e.g., the difference $Pb(n)-Pb(n-4)$).

For instance, a steady state is determined when the absolute value of an amount of change in negative intake pressure is smaller than a threshold value, an accelerated state is determined when the absolute value of an amount of change in negative intake pressure is larger than the threshold value and at the same time the amount of change has a positive sign (i.e., if the negative intake pressure sharply decreases), and a decelerated state is determined when the absolute value of an amount of change in negative intake pressure is large and the amount of change has a negative sign (i.e., if the negative intake pressure sharply increases).

In accordance with the result of determination, the process of estimating the EGR rate in steady, accelerated or decelerated state is performed in the EGR rate calculating sections 36, 37 and 38, as will be described below.

Process of Estimating the EGR Rate in Steady State

In a steady state, the mixture gas is transported in the branch 2a without being compressed or expanding. Thus, it may be possible to estimate the in-cylinder EGR rate $R_C(n)$ at present time from the eight-stroke-old in-tank EGR rate $R_S(n-8)$, as disclosed in JP-A-2001-254659. In the present embodiment, however, the four-stroke-old upstream and downstream branch EGR rates $R_U(n-4)$ and $R_L(n-4)$ are required for the estimating process in accelerated and decelerated states, and hence the in-cylinder EGR rate $R_C(n)$, downstream branch EGR rate $R_L(n)$, and upstream branch EGR rate $R_U(n)$ at the present time are estimated from the four-stroke-old downstream EGR rate $R_L(n-4)$, the four-stroke-old upstream EGR rate $R_U(n-4)$, and the in-tank EGR rate $R_S(n)$, respectively, as shown in the following formulae (4), (5) and (6):

$$R_C(n)=R_L(n-4) \qquad (4),$$

$$R_L(n)=R_U(n-4) \qquad (5),$$

$$R_U(n)=R_S(n) \qquad (6).$$

The upstream and downstream branch EGR rates $R_U(n)$ and $R_L(n)$ are stored in the ECU 21 as the preceding values $R_U(n-4)$ and $R_L(n-4)$, respectively. These stored values are renewed each time the upstream and downstream branch EGR rates are calculated.

Process of Estimating the EGR Rate in Accelerated State

Figure 4:
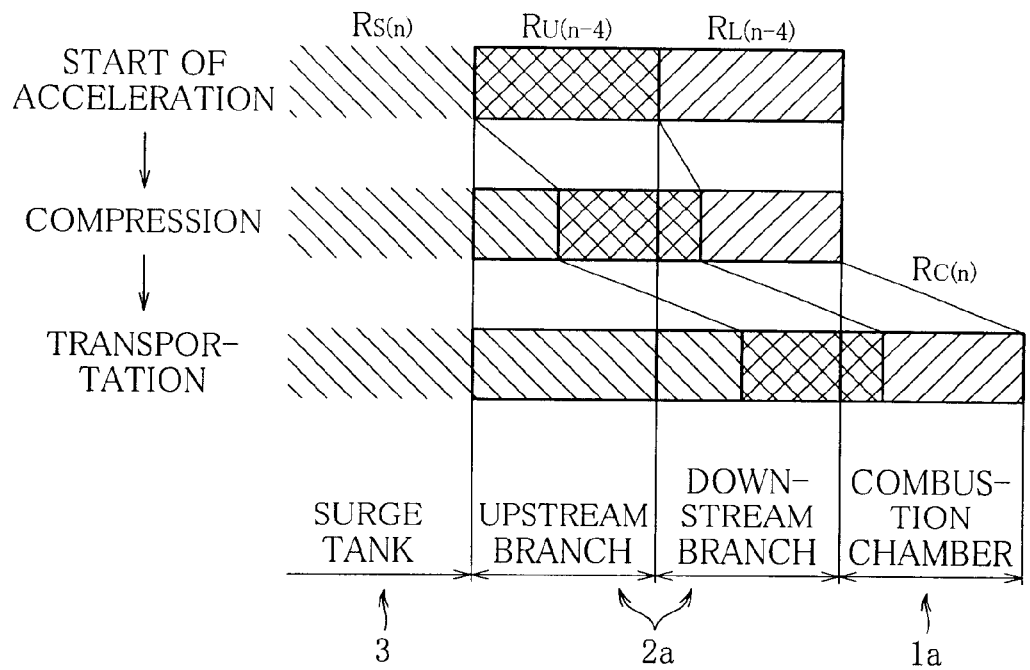
FIG. 4 is a view showing, in a schematic form, the behavior of mixture gas at the time of accelerated vehicle running.

FIG. 4 shows, in a schematic form, the behavior of mixture gas in the surge tank 3, upstream branch, downstream branch, and combustion chamber lain an accelerated state. At the start of acceleration at which an opening operation of the throttle valve 6 starts, mixture gas is not compressed as yet, so that mixture gas of in-tank EGR rate $R_S(n)$ at the present time is present in the surge tank 3, mixture gas of four-stroke-old upstream branch EGR rate $R_U(n-4)$ is present in the upstream branch, and mixture gas of four-stroke-old downstream branch EGR rate $R_L(n-4)$ is present in the downstream branch.

On the other hand, during the acceleration, the pressure in the surge tank 3 increases with the increase in amount of introduced fresh air and EGR gas, so that the mixture gas in the branches is compressed toward the downstream side in accordance with the ratio $Pb(n-4)/Pb(n)$ of the four-stroke-old negative intake pressure $Pb(n-4)$ to the negative intake pressure $Pb(n)$ at the present time. As a result, part of the mixture gas in the surge tank 3 flows into the upstream branch, and part of the mixture gas in the upstream branch flows into the downstream branch.

When a corresponding intake valve opens, the mixture gas is transported by a stroke which is half of the branch length, so that all the mixture gas (shown by hatching in upper part of FIG. 4) present in the downstream branch at the start of acceleration and part of the mixture gas (shown by cross-hatching in upper part of FIG. 4) present in the upstream branch at the start of acceleration are introduced into a corresponding combustion chamber 1a, while being compressed in accordance with the ratio $Pb(n-4)/Pb(n)$. Therefore, the in-cylinder EGR rate $R_C(n)$ can be represented by the following formula (7):

$$R_C(n) = R_L(n-4)\times Pb(n-4)/Pb(n) + \qquad (7)$$

$$R_U(n-4)\times\{1-Pb(n-4)/Pb(n)\}$$

The first term of the right side of formula (7) indicates what degree the introduction of the mixture gas, having downstream branch EGR rate $R_L(n-4)$ and present in the downstream branch in a compressed state just before the intake valve opens, into the combustion chamber contributes to the in-cylinder EGR rate $R_C(n)$. The second term of the right side of formula (7) indicates what degree the introduction of the mixture gas, having upstream branch EGR rate $R_U(n-4)$ and present in the downstream branch in a compressed state just before the intake valve opens, into the combustion chamber contributes to the in-cylinder EGR rate $R_C(n)$.

The ratio $Pb(n-4)/Pb(n)$ of the four-stroke-old negative intake pressure to the present negative intake pressure represents a pressure change in the surge tank 3 which is a direct cause of the compression (or expansion in a decelerated state) of mixture gas. In the estimation of in-cylinder EGR rate $R_C(n)$, this ratio serves as a volumetric-change-related value.

With the introduction of the mixture gas, present in the downstream branch in a compressed state, into the combustion chamber 1a upon opening of the intake valve, the remaining part of the mixture gas present in the upstream branch at the start of acceleration, and part of mixture gas present in the surge tank 3 at the start of acceleration are transported toward the downstream branch in a state compressed in accordance with the ratio $Pb(n-4)/Pb(n)$. Thus, the downstream branch EGR $R_L(n)$ can be represented by the following formula (8):

$$R_L(n) = R_U(n-4) \times \{2 \times Pb(n-4)/Pb(n) - 1\} + \quad (8)$$
$$R_S(n) \times \{2 - 2 \times Pb(n-4)/Pb(n)\}$$

The first term of the right side of formula (8) indicates what degree the transportation of the mixture gas, having upstream branch EGR rate $R_U(n-4)$ and present in the upstream branch in a compressed state just before the intake valve opens, toward the downstream branch contributes to the downstream branch EGR rate $R_L(n)$, whereas the second term of the right side indicates what degree the transportation of the mixture gas, having in-tank EGR rate $R_S(n)$ and present in the upstream branch in a compressed state just before the intake valve opens, toward the downstream branch contributes to the downstream branch EGR rate $R_L(n)$.

With the transportation of the mixture gas, present in the upstream branch in a compressed state, toward the downstream branch upon opening of the intake valve, the mixture gas present in the surge tank 3 at the start of acceleration and prior to the opening of the intake valve is transported into the upstream branch. Accordingly, irrespective of the compression state of mixture gas, the upstream branch EGR rate $R_U(n)$ can be represented by the following formula (9):

$$R_U(n) = R_S(n) \quad (9)$$

Process of Estimating the EGR Rate in Decelerated State

Figure 5:
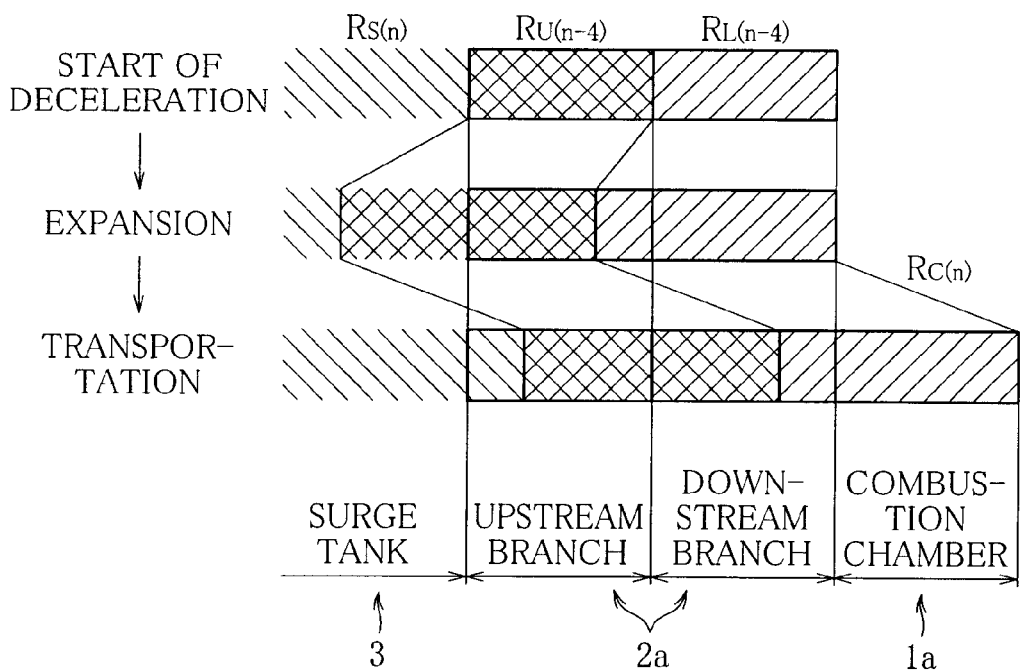
FIG. 5 is a schematic view showing the behavior of mixture gas at the time of decelerated vehicle running.

FIG. 5 shows, in a schematic form, the behavior of mixture gas in the surge tank 3, upstream branch, downstream branch, and combustion chamber 1a in a decelerated state. At the start of deceleration at which a closing operation of the throttle valve 6 starts, mixture gas does not expand as yet, so that EGR rates of mixture gas in the surge tank 3, upstream branch, and downstream branch are $R_S(n)$, $R_U(n-4)$ and $R_L(n-4)$, respectively. These EGR rates are the same as those observed at the start of acceleration.

On the other hand, during the deceleration, the pressure in the surge tank 3 decreases with the decrease in amount of introduced fresh air and EGR gas, so that the mixture gas in the branches expands toward the upstream side in accordance with the ratio $Pb(n-4)/Pb(n)$ of the four-stroke-old negative intake pressure $Pb(n-4)$ to the present negative intake pressure $Pb(n)$. As a result, part of the mixture gas in the downstream branch flows into the upstream branch, and part of the mixture gas in the upstream branch flows into the surge tank 3.

When a corresponding intake valve opens, the mixture gas is transported by a stroke which is half of the branch length, so that the mixture gas present in the downstream branch in an expanding state (i.e., part of the mixture gas present in the downstream branch at the start of deceleration) is introduced into a corresponding combustion chamber 1a. Therefore, irrespective of expansion state of mixture gas, the in-cylinder EGR rate $R_C(n)$ can be represented by the following formula (10):

$$R_C(n) = R_L(n-4) \quad (10).$$

The mixture gas present in the upstream branch in an expanding state just before the intake valve opens is transported into the downstream branch. Specifically, the remaining part of the mixture gas present in the downstream branch at the start of deceleration and part of the mixture gas present in the upstream branch at the start of deceleration are transported into the downstream branch in a state expanding in accordance with the ratio $Pb(n-4)/Pb(n)$. Therefore, the downstream branch EGR rate $R_L(n)$ can be represented by the following formula (11):

$$R_L(n) = R_L(n-4) \times [Pb(n-4)/Pb(n) - 1] + \quad (11)$$
$$R_U(n) \times \{2 - Pb(n-4)/Pb(n)\}$$

The first and second terms of the right side of formula (11) indicate what degree the transportation of the mixture gases, each having downstream and upstream branch EGR rates $R_L(n-4)$, $R_U(n)$ and present in the upstream branch in an expanding state, toward the downstream branch contributes to the downstream branch EGR rate $R_L(n)$, respectively.

The remaining part of the mixture gas present in the upstream branch at the start of deceleration, and part of mixture gas present in the surge tank 3 are transported toward the upstream branch in a state expanding in accordance with the ratio $Pb(n-4)/Pb(n)$. In other words, mixture gas present in the surge tank just before the intake valve opens is transported into the upstream branch. Thus, the upstream branch EGR $R_U(n)$ can be represented by the following formula (12):

$$R_U(n) = R_U(n-4) \times \{2 \times Pb(n-4)/P(n) - 2\} + \quad (12)$$
$$R_S(n) \times \{3 - 2 \times Pb(n-4)/P(n)\}$$

The first term of the right side of formula (12) indicates what degree the transportation of the mixture gas, having upstream branch EGR rate $R_U(n-4)$ and having a certain occupancy in the surge tank 3 just before the intake valve opens, toward the upstream branch contributes to the upstream branch EGR rate $R_U(n)$, whereas the second term of the right side indicates what degree the transportation of the mixture gas of in-tank EGR rate $R_S(n)$ toward the upstream branch contributes to the upstream branch EGR rate $R_U(n)$.

Figure 3:
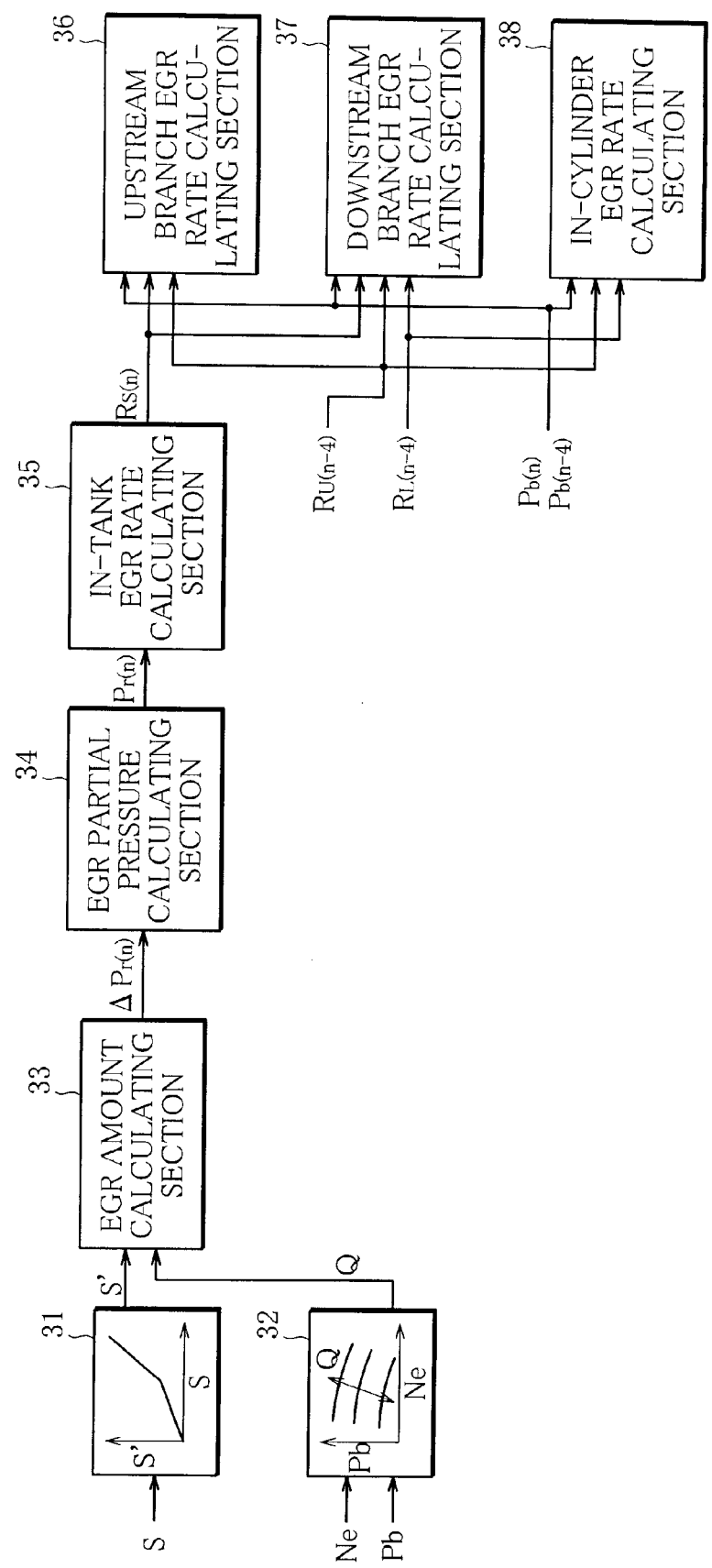
FIG. 3 is a functional block diagram showing an in-cylinder EGR rate $R_C(n)$ estimating function of the ignition timing control system.

As explained above, each of the EGR rate calculating sections 35–38 shown in FIG. 3 makes a determination as to whether the engine (i.e., the vehicle mounted with the engine) is in a steady, accelerated or decelerated state based on an amount of change in negative intake pressure Pb, and, in accordance with the result of determination, performs the process of estimating the EGR rate in a steady, accelerated or decelerated state, thereby calculating the EGR rate $R_S(n)$, $R_U(n)$, $R_L(n)$ or $R_C(n)$ for every stroke. The EGR rates $R_U(n)$ and $R_L(n)$ are stored, as preceding values that are used as the four-stroke-old EGR rates $R_U(n-4)$ and $R_L(n-4)$ in the next estimating process. The in-cylinder EGR rate $R_C(n)$ is used for setting the ignition timing SA.

Figure 6:
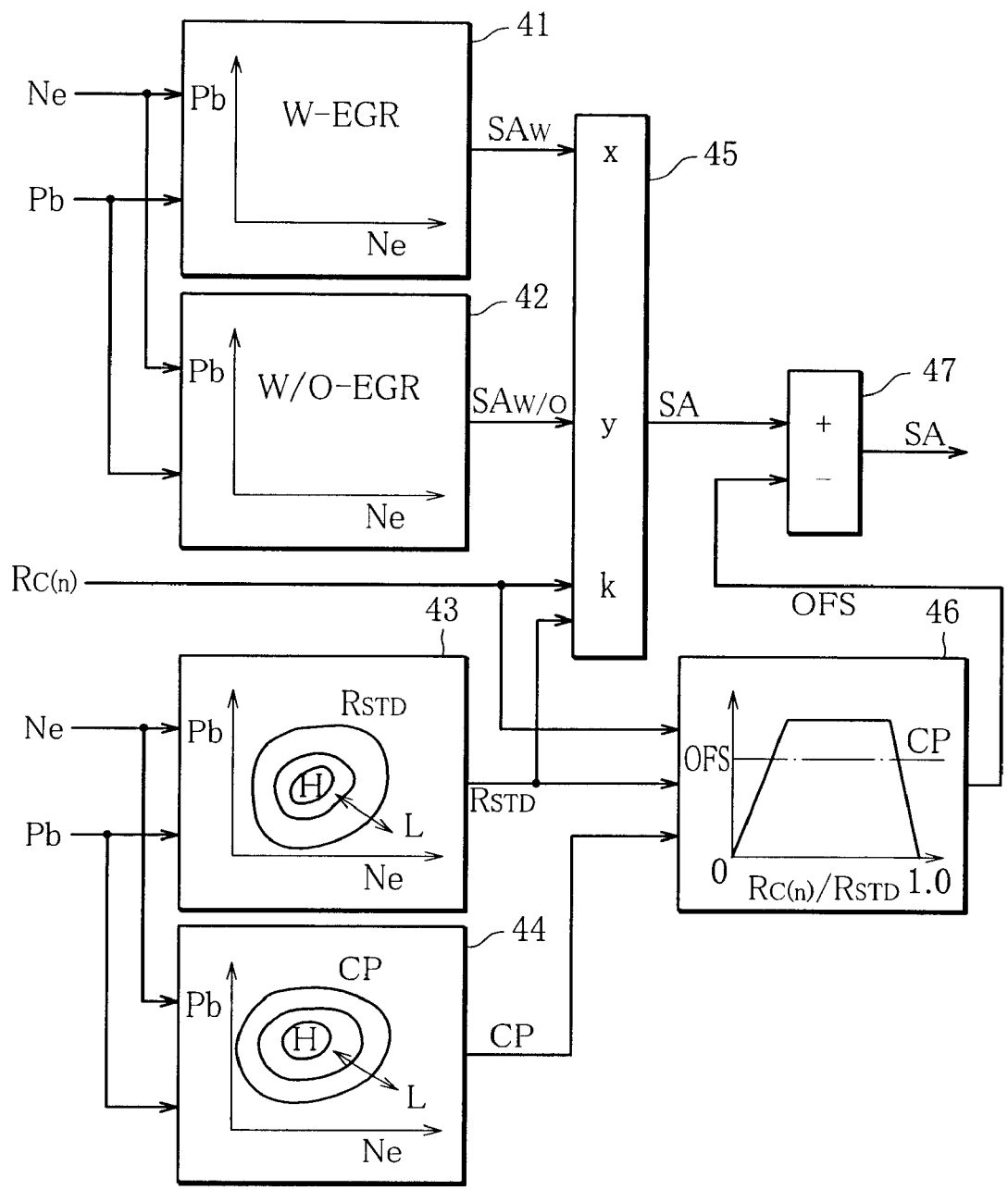
FIG. 6 is a functional block diagram showing an ignition timing SA setting function of the ignition timing control system.

FIG. 6 shows an operation flow relating to the process of setting the ignition timing SA. In accordance with engine rotation speed Ne and negative intake pressure Pb, an EGR ignition timing calculating section 41 determines an ignition timing SAw for EGR operation from a map, whereas a non-EGR ignition timing calculating section 42 determines an ignition timing SAw/o for non-EGR operation from a map. Further, a target EGR calculating section 43 determines a target EGR rate $R_{STD}$ from a map in accordance with engine rotation speed Ne and negative intake pressure Pb, and a clip value calculating section 44, serving as clip value setting means, determines a clip value CP from a map. The clip value CP indicates an allowable upper limit of a retard amount OFS (mentioned later), so that the retard amount OFS is limited up to the clip value CP.

As apparent from the map shown in FIG. 6, a predetermined characteristic of the target EGR rate $R_{STD}$ is similar to that of the clip value CP. Specifically, the target EGR rate $R_{STD}$ and the clip value CP are set in such a manner that they are at maximum values in a central region where engine rotation speed Ne and negative pressure Pb have medium values, respectively, and they take smaller values toward outer regions of engine rotation speed and negative pressure. In the outermost region, the target EGR rate $R_{STD}$ has a value of 0 (for non-EGR operation), and the clip value CP has its minimum value.

The obtained ignition timings SAw, SAw/o and the target EGR rate $R_{STD}$ are input, together with the in-cylinder EGR rate $R_C(n)$ estimated as mentioned previously, into an interpolation processing section 45 serving as target ignition timing setting means, in which the ignition timing SA corresponding to the in-cylinder EGR rate $R_C(n)$ at the present time is calculated by means of linear interpolation in accordance with the following formula (13):

$$SA = SAw/o + (SAw - SAw/o) \times R_C(n)/R_{STD} \qquad (13).$$

The in-cylinder EGR rate $R_C(n)$ and the target EGR rate $R_{STD}$ are input into a retard amount calculating section 46 serving as retard amount setting means, which determines a retard amount OFS from a map in accordance with the EGR rate ratio $R_C(n)/R_{STD}$. As apparent from the map shown in FIG. 6, the retard amount OFS is set at a value of 0 when the ratio $R_C(n)/R_{STD}$ is at 0 or 1.0, whereas it is set at its maximum value in an intermediate zone of the variable range of the ratio $R_C(n)/R_{STD}$, in which range the ratio varies from 0 to 1.0. In the map, when the retard amount OFS exceeds the clip value CP, the retard amount OFS is restricted to the clip value CP. Then, in a subtracting section 47 serving as ignition timing setting means, the retard amount OFS is subtracted from the ignition timing SA, and the ignition timing SA after subtraction is used as a target value for ignition timing control.

By means of the ECU 21 serving as ignition timing controlling means, the ignition timing SA is controlled in accordance with the operating state of the engine 1, as described below.

EGR control is carried out under the control of the ECU 21 serving as EGR controlling means. In the EGR control, the degree of opening of the EGR valve 11 is controlled in accordance with the target EGR rate $R_{STD}$ that is set in the target EGR calculating section 43, whereby the actual EGR rate $R_C(n)$ of mixture gas introduced into the combustion chamber 1a is adjusted to the target EGR rate $R_{STD}$. For example, when the target EGR rate $R_{STD}$ changes from 0% to 20% in the increasing direction with the change in operating region of the engine 1, the in-cylinder EGR rate $R_C(n)$ is controlled to the increasing direction so as to follow the increasing target EGR rate $R_{STD}$.

The interpolation processing section 45 periodically calculates the ignition timing SA that corresponds to the gradually increasing in-cylinder EGR rate $R_C(n)$. In a transition state, e.g., a transition from non-EGR operation to EGR operation (in this example, the transition is accompanied with a stepwise change of the target EGR rate $R_{STD}$ from 0% to 20%), the calculated ignition timing SA linearly changes from a value corresponding to the in-cylinder EGR rate $R_C(n)=0\%$ to a value equivalent to the $R_C(n)=20\%$, as shown by the dotted line in FIG. 7, with elapse of time. The setting of ignition timing SA in the interpolation processing section 45 is carried out in the same manner as described in JP-A-2001-254659, for instance.

The in-cylinder EGR rate $R_C(n)$ follows the stepwisely changed target EGR rate $R_{STD}$ with a delay caused by pressure storage effect of the intake system, so that the ratio $R_C(n)/R_{STD}$ varies from 0 to 1.0 during the period from when the transition from non-EGR to EGR starts and to when the transition ends (more generally, during the transition state). Thus, the retard amount OFS set in the retard amount calculating section 46 changes from 0 to its maximum value and the from the maximum value to 0. Since the retard amount OFS is subtracted from the ignition timing SA, the resultant ignition timing SA is retarded, as shown by the solid line in FIG. 7, in a transition state in which the in-cylinder EGR rate $R_C(n)$ varies.

Figure 7:
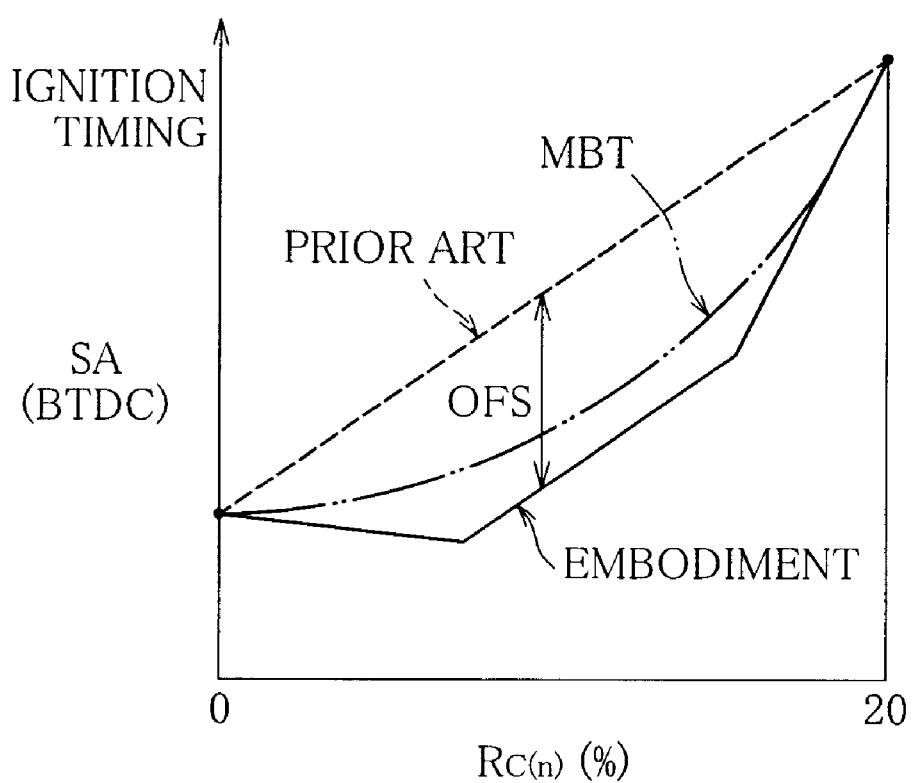
FIG. 7 is a view showing how ignition retard is performed in a transition state where the in-cylinder EGR rate $R_C(n)$ varies.

The present inventors confirmed by experiments that, when the in-cylinder EGR rate $R_C(n)$ is in a transition state, the ignition timing SA providing the MBT is on the delay side with respect to a linear-interpolation-based characteristic shown by the dotted line in FIG. 7. Even in such a transition state, with use of the retarded ignition timing SA, ignition timing control to almost provide the MBT can be achieved. Thus, the ignition timing control system for the engine 1 according to the present embodiment makes it possible to suppress occurrences of knocking due to excessively advanced ignition timing in a transition state, thereby positively prevent deteriorated fuel consumption and deteriorated drivability which would be otherwise caused by knocking.

In addition, experiments conducted by the present inventors confirmed that the ignition timing characteristic (shown by the two-dotted chain line) which provides the MBT is affected by the in-cylinder EGR rate $R_C(n)$ and that the greater in-cylinder EGR rate $R_C(n)$, the more the ignition timing characteristic equivalent to the MBT is shifted to the delay side (i.e., the necessity of ignition retard increases). As explained above, the retard amount OFS is restricted up to its allowable upper limit defined by the clip value CP that is variably set to have a characteristic similar to that of the target EGR rate $R_{STD}$. As a consequence, the higher in-cylinder EGR rate $R_C(n)$ at which knocking due to excessive advancement of ignition timing more likely occurs, the larger the ignition timing SA is retarded based on a large clip value CP (=retard amount OFS).

As a consequence, the influence of the in-cylinder EGR rate $R_C(n)$ upon the ignition timing characteristic is eliminated, so that the ignition timing SA is more properly controlled, whereby fuel consumption and drivability can be further improved, as compared to a case where the retard amount OFS is set simply based on the ratio $R_C(n)/R_{STD}$ (without using the clip value CP), for instance.

This invention is not limited to the embodiment which has been explained in the above. For instance, in the foregoing embodiment, this invention is embodied in the ignition timing control system for the intake-pipe injection type inline four-cylinder gasoline engine 1, however, the present invention is applicable to engines of other types such as, by way of example, an in-cylinder injection gasoline engine adapted to inject fuel directly into combustion chambers, and to other engines which are different in cylinder arrangement or in number of cylinders from the engine 1 described above.

In the embodiment, the in-cylinder EGR rate $R_C(n)$ is estimated by taking into account of compression/expansion of mixture gas in upstream and downstream branches, and the estimated EGR rate is utilized to determine the ratio $R_C(n)/R_{STD}$ that is used for the setting of retard amount OFS. However, a method for estimating the in-cylinder EGR rate $R_C(n)$ is not limited thereto. For instance, the estimation may be made without considering the compression/expansion of mixture gas.

In the embodiment, the retard amount OFS is limited to its allowable upper limit defined by the clip value CP, in order to achieve the ignition retard based on the in-cylinder EGR rate $R_C(n)$. However, this invention is not limited thereto. For instance, the processing based on the clip value CP may be omitted. Alternatively, the retard amount OFS may be multiplied by a correction coefficient that is set in accordance with engine rotation speed Ne and negative intake pressure Pb, in order to attain advantages similar to those obtained by using the clip value CP.

In the above-described embodiment, each branch 2a is divided into two, i.e., upstream and downstream branches, and upstream and downstream EGR rates $R_U(n)$, $R_L(n)$ are calculated, respectively. As apparent from the foregoing explanation, the ratio of the branch volume to the cylinder volume determines the number into which the branch 2a is to be divided, and therefore, if the branch 2a has a volume three times as large as the cylinder volume, the branch 2a is divided into three zones, i.e., upstream, middlestream and downstream branches, and the EGR rates for these three zones are calculated, respectively.

What is claimed is:

1. An ignition timing control system for an internal combustion engine, comprising:
    EGR controlling means for controlling a valve opening of an EGR valve in accordance with a target EGR rate varying depending on an operating state of the internal combustion engine, the EGR valve being provided in an EGR passage that connects an exhaust system of the internal combustion engine to an intake system thereof;
    EGR rate estimating means for estimating an EGR rate of the internal combustion engine in accordance with the operating state thereof;
    target ignition timing setting means for setting a target ignition timing, corresponding to the EGR rate estimated by said EGR rate estimating means, based on an ignition timing for EGR operation and an ignition timing for non-EGR operation that are individually determined from first and second maps set in advance;
    retard amount setting means for setting a retard amount based on a ratio between the estimated EGR rate and the target EGR rate;
    ignition timing correcting means for correcting the target ignition timing, set by said target ignition timing setting means, in accordance with the retard amount set by said retard amount setting means; and
    ignition timing controlling means for controlling an ignition timing of the internal combustion engine in accordance with the target ignition timing corrected by said ignition timing correcting means.

2. The ignition timing control system according to claim 1, wherein said retard amount setting means sets the retard amount to be larger in an intermediate zone of the variable range of the ratio between the estimated and target EGR rates.

3. The ignition timing control system according to claim 2, further comprising:
    clip value setting means for setting a clip value, representing an allowable upper limit of the retard amount, in accordance with rotation speed and load of the internal combustion engine,
    wherein said ignition timing correcting means corrects the target ignition timing based on the retard amount that is limited to the clip value.

4. The ignition timing control system according to claim 2, further comprising:
    correction coefficient setting means for setting a correction coefficient, which is to be used to correct the retard amount, in accordance with rotation speed and load of the internal combustion engine,
    wherein said ignition timing correcting means corrects the target ignition timing in accordance with the retard amount corrected by using the correction coefficient.

5. The ignition timing control system according to claim 1, wherein said internal combustion engine comprises a surge tank in which fresh air introduced from the intake system of the engine is mixed with EGR gas introduced through the EGR passage from the exhaust system of the engine, and an intake manifold which includes branches and through which the surge tank is connected with respective cylinders of the engine, and
    wherein said EGR rate estimating means includes:
        first EGR-rate calculating means for calculating an EGR rate in the surge tank each time mixture gas is transported from the surge tank to the branches upon intake stroke of the internal combustion engine;
        EGR rate storing means for storing, as a preceding value, an EGR rate of mixture gas in each of those regions of the branches which are divided in advance in accordance with a transportation stroke of the mixture gas caused with the intake stroke of the engine;
        second EGR-rate calculating means for calculating an EGR rate of mixture gas in said each region after the transportation stroke and an EGR rate of mixture gas introduced into the respective cylinders after the transportation stroke, each time mixture gas is transported upon intake stroke of the internal combustion engine, in accordance with the EGR rate in the surge tank calculated by said first EGR-rate calculating means, the preceding value of the EGR rate in said each region that is stored in said EGR rate storing means, and volumetric-change-related value correlating with a volumetric change in the mixture gas in the branches; and
        EGR rate renewing means for renewing the EGR rate, stored in said EGR rate storing means, in accordance with the EGR rate of the mixture gas in said each region of the branch each time the EGR rate is calculated by said second EGR-rate calculating means.

6. The ignition timing control system according to claim 5, wherein said second EGR-rate calculating means sets the volumetric-change-related value based on a preceding value and a present value of pressure in the surge tank.

7. The ignition timing control system according to claim 5, wherein said first EGR-rate calculating means calculates an EGR amount introduced into the surge tank in accordance with an EGR flow velocity and the valve opening of the EGR valve linearlized so as to correspond to an opening area of the EGR valve, and calculates the EGR rate in the surge tank in accordance with an EGR partial pressure in the surge tank determined from the EGR amount and a fresh-air partial pressure corresponding to an amount of fresh air introduced into the surge tank.

* * * * *